(12) United States Patent
Ono et al.

(10) Patent No.: US 7,873,651 B2
(45) Date of Patent: Jan. 18, 2011

(54) METHOD AND SYSTEM FOR INTERACTIVE DECISION TREE MODIFICATION AND VISUALIZATION

(75) Inventors: Ken Ono, King City (CA); Matthew Francey, Toronto (CA); Roman Ruginets, Thornhill (CA)

(73) Assignee: Angoss Software Corporation, Toronto (CA)

( * ) Notice: Subject to any disclaimer, the term of this patent is extended or adjusted under 35 U.S.C. 154(b) by 416 days.

(21) Appl. No.: 11/126,232

(22) Filed: May 11, 2005

(65) Prior Publication Data

US 2006/0047640 A1    Mar. 2, 2006

Related U.S. Application Data

(60) Provisional application No. 60/569,619, filed on May 11, 2004.

(51) Int. Cl.
*G06F 17/30* (2006.01)
(52) U.S. Cl. .................. 707/769; 707/609; 707/610; 707/999.3; 709/201
(58) Field of Classification Search .................. None
See application file for complete search history.

(56) References Cited

U.S. PATENT DOCUMENTS

| | | | |
|---|---|---|---|
| 5,802,254 A | 9/1998 | Satou et al. ............... 395/68 |
| 5,838,973 A | 11/1998 | Carpenter-Smith et al. .. 395/701 |
| 5,999,192 A * | 12/1999 | Selfridge et al. ........... 345/440 |
| 6,243,696 B1 | 6/2001 | Keeler et al. ............... 706/21 |
| 6,636,862 B2 | 10/2003 | Lundahl et al. ............. 707/101 |
| 6,727,927 B1 * | 4/2004 | Dempski et al. ........... 715/853 |
| 6,941,318 B1 * | 9/2005 | Tamayo et al. ............. 707/102 |
| 6,973,459 B1 * | 12/2005 | Yarmus ..................... 707/102 |
| 7,085,981 B2 * | 8/2006 | Aggarwal .................. 714/738 |
| 7,346,601 B2 * | 3/2008 | Chaudhuri et al. ................. 1/1 |
| 2003/0061212 A1 * | 3/2003 | Smith et al. ............... 707/6 |
| 2003/0126104 A1 * | 7/2003 | Evans-Beauchamp et al. .. 707/1 |
| 2003/0131007 A1 * | 7/2003 | Schirmer et al. ........... 707/100 |
| 2003/0220860 A1 * | 11/2003 | Heytens et al. ............. 705/35 |
| 2003/0229625 A1 * | 12/2003 | Melchior et al. ........... 707/3 |
| 2004/0128287 A1 * | 7/2004 | Keller et al. ............... 707/3 |
| 2004/0153441 A1 * | 8/2004 | Dettinger et al. ........... 707/3 |
| 2004/0181526 A1 * | 9/2004 | Burdick et al. ............. 707/6 |
| 2004/0215599 A1 * | 10/2004 | Apps et al. ................. 707/2 |
| 2004/0249867 A1 * | 12/2004 | Kraiss et al. ............... 707/203 |
| 2005/0038688 A1 * | 2/2005 | Collins et al. .............. 705/9 |
| 2005/0044197 A1 * | 2/2005 | Lai .......................... 709/223 |

(Continued)

OTHER PUBLICATIONS

International Search Report for PCT/CA2005/000723, mailed Sep. 6, 2005.

*Primary Examiner*—Don Wong
*Assistant Examiner*—Shyue Jiunn Hwa
(74) *Attorney, Agent, or Firm*—Joseph Conneely; McCarthy Tetrault LLP (57) ABSTRACT

A method in a server coupled to at least one client for modifying a data mining model for display to a user of the client, the data mining model maintained by the server, the method comprising: receiving a request message from the client to modify the data mining model; generating change definitions from the request message to modify the data mining model; storing the change definitions in a document; and, transmitting the document to the client, the client being adapted to generate a modified data mining model for display to the user from the change definitions.

12 Claims, 7 Drawing Sheets

U.S. PATENT DOCUMENTS

2005/0096950 A1* 5/2005 Caplan et al. .................. 705/7
2005/0114377 A1* 5/2005 Russell et al. ............... 707/102
2005/0125401 A1* 6/2005 Carr et al. ...................... 707/5
2007/0022136 A1* 1/2007 Keller et al. ................ 707/102

* cited by examiner

| Action | SQL | Example |
|---|---|---|
| 310 — Erase All or Part of the Tree | delete * from model <ModelName> where parent_unique_name=<node id> | delete * from model [MyModel] where parent_unique_name='x' |
| 320 — Grow a Sub Tree (Find Split) | alter model <ModelName> define parameter <ParamName>=<Value>, ...<br><br>insert into model <ModelName> where node_unique_name=<NodeIDToExtend> select <data inputs> | alter model [MyModel] define parameter GrowAutomaticMaxDepth = 2, define parameter GrowAutomaticStopSize = 0, define parameter KeepSplitTable = 10, define parameter KeepRootSplits = 10, define parameter KeepSubSplits = 10, define parameter ValidationHoldback = 0<br><br>insert into model [MyModel] where node_unique_name='x.15/0' select [initial score], [number inquiries], [worst rating des], [year last check], [major derog num], [satisfactory num], [year at address], [bank reference], [fin co ref], [dept store ref], [bank dda ref], [bank save ref], [credit card ref], [region], [age], [residential status], [status] from [MyTable] |
| 330 — Viewing an Alternative Split or Sub Tree (Goto Split) | update model <ModelName> set NODE_ACTIVE = false where PARENT_UNIQUE_NAME = <NodeID><br><br>update model <ModelName> set NODE_ACTIVE = true where BRANCH_VARIABLE = 'Number Inquiries' | update model [MyModel] set NODE_ACTIVE = false where PARENT_UNIQUE_NAME = 'x.15/0'<br><br>update model [MyModel] set NODE_ACTIVE = true where BRANCH_VARIABLE = 'Number Inquiries' |
| 340 — Building a Branch of Specific Values (Force Split) | insert into model <ModelName> where node_unique_name = <NodeID> from xml <XML for value map> select <data source> | insert into model [MyModel] where node_unique_name = 'x' from xml '<?xml version="1.0"?><node><split IV="13"><node><branch-values><value type="string">Eight</value><value type="string">Eleven</value><value type="string">Five</value><value type="string">Four</value></branch-values></node><node><branch-values><value type="string">Nine</value><value type="string">One</value><value type="string">Other</value><value type="string">Seven</value></branch-values></node><node><branch-values><value type="string">Six</value><value type="string">Ten</value><value type="string">Three</value><value type="string">Twelve</value><value type="string">Two</value></branch-values></node></split></node>' select [initial score], [number inquiries], [worst rating des], [year last check], [major derog num], [satisfactory num], [year at address], [bank reference], [fin co ref], [dept store ref], [bank dda ref], [bank save ref], [credit card ref], [region], [age], [residential status], [status] from [MyTable] |

METHOD AND SYSTEM FOR INTERACTIVE DECISION TREE MODIFICATION AND VISUALIZATION

This application claims priority from U.S. Provisional Patent Application No. 60/569,619, filed May 11, 2004, and incorporated herein by reference.

FIELD OF THE INVENTION

This invention relates to the field of data mining, and more specifically, to interactive decision tree modification and visualization.

BACKGROUND

In general, data mining is an information extraction activity whose goal is to discover hidden facts contained in databases. Using a combination of machine learning, statistical analysis, modeling techniques and database technology, data mining finds patterns and subtle relationships in data and infers rules that allow the prediction of future results. Typical applications include market segmentation, customer profiling, fraud detection, evaluation of retail promotions, and credit risk analysis.

The Web Services Description Language ("WSDL") and Extensible Markup Language ("XML") have emerged as standard client/server protocols. Similarly, standards are emerging for data mining ("DM") and web services. Specifically, OLE DB-DM defines extensions to the Structured Query Language ("SQL") for the creation of predictive models (i.e., "DM-SQL") and the XML for Analysis standard has been proposed as a way of transporting DM-SQL via a Web Service.

Now, existing methods and systems allow for the creation of data mining models on a batch basis or on an incremental basis by adding new, previously unused rows. For example, commercial products typically implement interactive decision trees using single tier and client/server architectures using the Distributed Component Object Model/Component Object Model ("DCOM/COM"). However, such existing systems do not provide effective user interaction or model visualization in client/server systems.

A need therefore exists for an improved method and system for interacting with and visualizing data mining models in client/server systems. Accordingly, a solution that addresses, at least in part, the above and other shortcomings is desired.

SUMMARY

According to one aspect of the invention, there is provided a method in a server coupled to at least one client for modifying a data mining model for display to a user of the client, the data mining model maintained by the server, the method comprising: receiving a request message from the client to modify the data mining model; generating change definitions from the request message to modify the data mining model; storing the change definitions in a document; and, transmitting the document to the client, the client being adapted to generate a modified data mining model for display to the user from the change definitions.

In accordance with further aspects of the present invention there is provided an apparatus such as a server system and a client system, a method for adapting these systems, as well as articles of manufacture such as a computer readable medium having program instructions recorded thereon for practicing the method of the invention.

BRIEF DESCRIPTION OF THE DRAWINGS

Further features and advantages of the embodiments of the present invention will become apparent from the following detailed description, taken in combination with the appended drawings, in which:

FIG. 3 is a table listing exemplary syntactical extensions to the DM-SQL language in accordance with an embodiment of the invention;

It will be noted that throughout the appended drawings, like features are identified by like reference numerals.

DETAILED DESCRIPTION OF THE PREFERRED EMBODIMENTS

The following detailed description of the embodiments of the present invention does not limit the implementation of the invention to any particular computer programming language. The present invention may be implemented in any computer programming language provided that the operating system ("OS") provides the facilities that may support the requirements of the present invention. For example, the invention may be implemented in the C or C++ computer programming languages or other computer programming languages such as JAVA™. (JAVA and all JAVA-based trademarks are the trademarks of Sun Microsystems Corporation.) Any limitations presented would be a result of a particular type of operating system or computer programming language and would not be a limitation of the present invention. According to one embodiment, C or C++ may be used to implement the invention on a server while C# Windows Forms (i.e., part of the Microsoft™ NET Framework) or HTML (i.e., JavaScript™ in DOM) may be used to implement the invention on a client.

Figure 1:
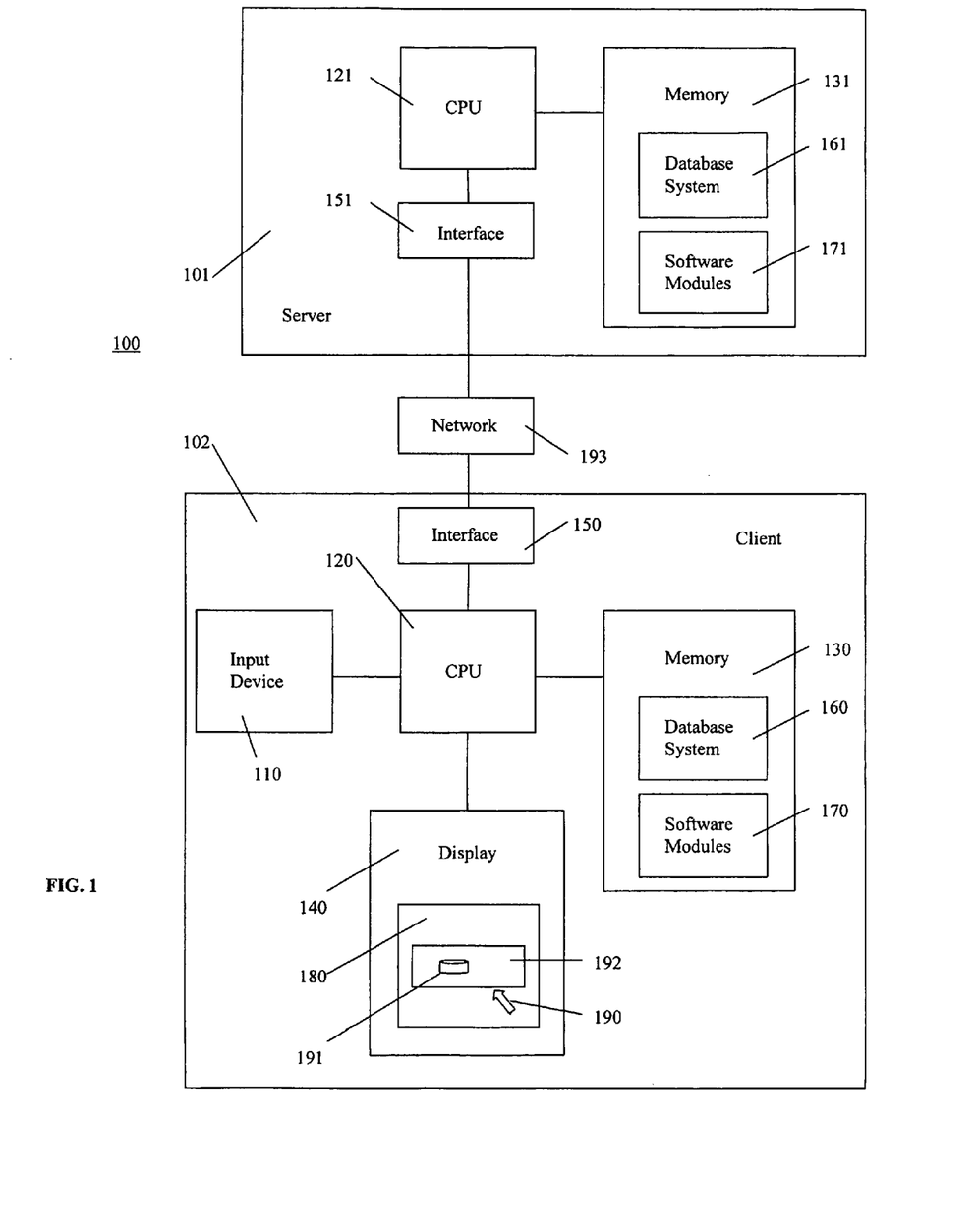
FIG. 1 is a block diagram illustrating a data mining client/server system adapted for implementing an embodiment of the invention.

FIG. 1 is a block diagram illustrating a data mining client/server system 100 adapted for implementing an embodiment of the invention. The client/server system 100 includes a server 101, which may be maintained by a service provider, communicating with one or more clients 102 over a network 193, such as the Internet. Typically, each server 101 and client 102 includes an input device 110, a central processing unit ("CPU") 120, 121, memory 130, 131, a display 140, and an interface 150, 151. The input device 110 may include a keyboard, mouse, trackball, remote control, or similar device. The CPU 120, 121 may include dedicated coprocessors and memory devices. The memory 130, 131 may include RAM, ROM, or disk devices. The display 140 may include a computer screen, terminal device, or a hardcopy producing output device such as a printer or plotter. And, the interface 150, 151 may include a network connection including an Internet connection.

The server 101 includes a database system 161 for storing and accessing information for one or more clients 102 and provides transaction and content searching functionality. The server's database system 161 may include a database management system ("DBMS") coupled to a database and stored in the memory 131 of the server 101. It will be appreciated that the database system 161 may be shipped or installed without the database to or by end users. In general, the DBMS is adapted to read a query generated by the server 101 in response to a request for information generated by a client 102 and submitted over the network 193. The DBMS then executes the query against the database and provides a query result to the server 101 for presentation to the client user. It will be appreciated that the database system 161 may be stored in the memory 131 of the server 101 or stored in a distributed data processing system (not shown).

An example of a suitable DBMS is the DB2™ Universal Database Management System product sold by IBM™. The DBMS is a software layer interposed between the actual database (i.e. the data as stored for use by the CPU 121 of the server 101) and the users of the system. The DBMS is responsible for handling database transactions thus shielding users from the details of any specific computer hardware or database implementation. Using relational techniques, the DBMS stores, manipulates and retrieves data in the form of table-like relations typically defined by a set of columns or attributes of data types and a set of rows (i.e. records or tuples) of data. The standard database query language for dealing with relational databases implemented by most commercial DBMSs is the Structured Query Language ("SQL").

The server 101 includes a CPU 121 operatively coupled to memory 131 which also stores an operating system (not shown) for general management of the server system 101. An example of a suitable server system 101 is an IBM™ iSeries™ computer. The server 101 includes computer executable programmed instructions for directing the server 101 to implement the embodiments of the present invention. The programmed instructions may be embodied in one or more software modules 171 resident on the server 101. Alternatively, the programmed instructions may be embodied on a computer readable medium (such as a CD disk or floppy disk) which may be used for transporting the programmed instructions to the memory 131 of the server 101. Alternatively, the programmed instructions may be embedded in a computer-readable, signal-bearing medium that is uploaded to a network 193 by a vendor or supplier of the programmed instructions, and this signal-bearing medium may be downloaded to the server 101 from the network 193 by end users or potential buyers.

The CPU 121 of the server 101 is typically coupled to one or more devices (not shown) for receiving user commands or queries and for presenting the results of these commands or queries to users locally or remotely via the network 193. User queries may be transformed into a combination of SQL commands for producing one or more tables of output data which may be incorporated in one or more documents, user interfaces, or Web pages for presentation to the user. The CPU 121 is coupled to memory 131 for containing programs and data such as base tables or virtual tables such as views or derived tables. As mentioned, the memory 131 may include a variety of storage devices including internal memory and external mass storage typically arranged in a hierarchy of storage as understood to those skilled in the art.

As will also be understood by those skilled in the art, the server 101 may include a number of separate servers depending on system 100 requirements. For example, the server 101 may include separate presentation, application, transaction, data, security, and edge servers.

Each client 102 includes a CPU 120 operatively coupled to memory 130 which also stores an operating system (not shown) for general management of the client system 102. An example of a suitable client system 102 is an IBM™ ThinkPad™ computer. The client 102 includes computer executable programmed instructions for directing the client 102 to implement the embodiments of the present invention. The programmed instructions may be embodied in one or more software modules 170 resident on the client 102. Alternatively, the programmed instructions may be embodied on a computer readable medium (such as a CD disk or floppy disk) which may be used for transporting the programmed instructions to the memory 130 of the client 102. Alternatively, the programmed instructions may be embedded in a computer-readable, signal-bearing medium that is uploaded to a network 193 by a vendor or supplier of the programmed instructions, and this signal-bearing medium may be downloaded to the client 102 from the network 193 by end users or potential buyers.

The CPU 120 of the client 102 is typically coupled to one or more devices 110 for receiving user commands or queries and for displaying the results of these commands or queries to the user on a display 140. Receiving and displaying user queries and results of queries is performed through a user interface typically presented to the user via a computer screen. The CPU 120 is coupled to memory 130 for containing programs and data. As mentioned, the memory 130 may include a variety of storage devices including internal memory and external mass storage typically arranged in a hierarchy of storage as understood to those skilled in the art. In addition, the client 102 may include a database system 160.

A user may interact with the client/server system 100 and its software modules 170, 171 using a graphical user interface ("GUI") 180. GUIs are supported by common operating systems and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Thus, in a GUI based system, a mouse 110 typically controls the position of a cursor icon 190 that is displayed on the display screen 140. The cursor 190 is moved by moving the mouse 110 over a flat surface, such as the top of a desk, in the desired direction of movement of the cursor 190. Thus, the two-dimensional movement of the mouse 110 on the flat surface translates into a corresponding two-dimensional movement of the cursor 190 on the display screen 140. Now, a mouse 110 typically has one or more finger actuated control buttons (i.e. mouse buttons). While the mouse buttons can be used for different functions such as selecting a menu option pointed at by the cursor 190, the disclosed invention may use a single mouse button to "select" an object and to trace the movement of the cursor 190 along a desired path. Specifically, to select an object 191, the cursor 190 is first located within the extent of the object 191 on the display 140. In other words, the cursor 190 is "pointed" at the object 191. Next, the mouse button is depressed and released. That is, the mouse button is "clicked". Selection is thus a point and click operation. To trace the movement of the cursor 190, the cursor 190 is located at the desired starting location, the mouse button is depressed to signal the CPU 120 to activate a function associated with the object 191, and the mouse 110 is moved while maintaining the button depressed. After the desired path has been traced, the mouse button is released. This procedure is often referred to as "clicking" and "dragging" (i.e. a click and drag operation). It will be understood that a predetermined key on a keyboard 110 could also be used to activate a mouse click or drag. In the following, the term "clicking" will refer to the depression of a mouse button indicating a selection by the user and the term "dragging" will refer to the subsequent motion of the mouse 110 and cursor 190 without the release of the mouse button.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Within an application window 192, windows are typically displayed in a similar manner and generally follow similar conventions for the arrangement of menus, style of dialog boxes, and use of the keyboard and mouse 110. The name of an application and any associated document, and a menu bar for the application are typically displayed at the top of the application window 192 which contains the running application. In addition, additional windows or panes may also be displayed. For example, a dialog box is a window that may be displayed to request information from the user or to supply information to the user.

Now, according to one embodiment of the invention, DM-SQL commands are passed by the Simple Object Access Protocol ("SOAP") or other means such as TCP/IP socket from a client 102 to a server 101. According to another embodiment, if the client 102 and server 101 are physically the same machine 100, then an in-memory transport means such as Microsoft™ COM can be used for passing the commands. These commands are used to visualize data mining models. Furthermore, these commands are used to incrementally and interactively build data mining models, including decision trees, for the purpose of knowledge discovery. The invention includes the ability to interactively grow a decision tree that extends a predictive model by interrogating the original dataset and interacting with an end user. This technique may be referred to as "interactive decision trees".

Advantageously, the present invention extends the OLE DB-DM and XML for Analysis (Web Services) standards to allow for the interactive exploration of relationships in the data for the purpose of knowledge discovery and predictive modeling. The present invention also includes visualization techniques for predictive models in conjunction with the SOAP and data mining standards.

For reference, an important function of data mining is the production of a "model". A model can be descriptive or predictive. A "descriptive model" helps in understanding underlying processes or behaviour. For example, a "cluster model" may be used to describe consumer behaviour. A "cluster" is a collection of data objects that are similar in some sense to one another. Clustering is a technique useful for exploring data that is particularly useful where there are many cases and no obvious natural groupings. In this situation, clustering algorithms can be used to find whatever natural groupings (i.e., clusters) that may exist. Clustering analysis identifies clusters embedded in the data. A good clustering algorithm produces high-quality clusters to ensure that the inter-cluster similarity is low and the intra-cluster similarity is high; in other words, members of a cluster are more like each other than they are like members of a different cluster. Thus, clustering algorithms find groups of items that are similar. For example, clustering can be used by an insurance company to group customers according to income, age, types of policies purchased, and prior claims experience. It divides a data set so that records with similar content are in the same group, and groups are as different as possible from each other. Since the categories are unspecified, a cluster model is sometimes referred to as unsupervised learning based model which means that the groupings of data are defined without the use of a dependent variable.

On the other hand, a "predictive model" is an equation or set of rules that makes it possible to predict an unseen or unmeasured value (the dependent variable or output) from other, known values (independent variables or input). The form of the equation or rules is suggested by mining data collected from the process under study. Typically, a training or estimation technique is used to estimate the parameters of the equation or rules. In general, the term "training" or "learning" in data mining refers to the estimation of model parameters based on existing data (e.g., training data). Typically, a predictive model consists of one or more decision trees. A "decision tree" is a tree-like way of representing a collection of hierarchical rules that lead to a class or value. Thus, the predictive models summarizes relationships in the data in the form of rules. For example, a predictive model may predict that if an individual in a selected group is between the ages of 30 and 33, then there is a 21% chance that that individual's income is greater than $50,000 (see FIG. 4 which will be discussed below). Because these hierarchical rules as described by decision trees may also describe "segments", decision tree models can also be considered as descriptive models.

Figure 2:
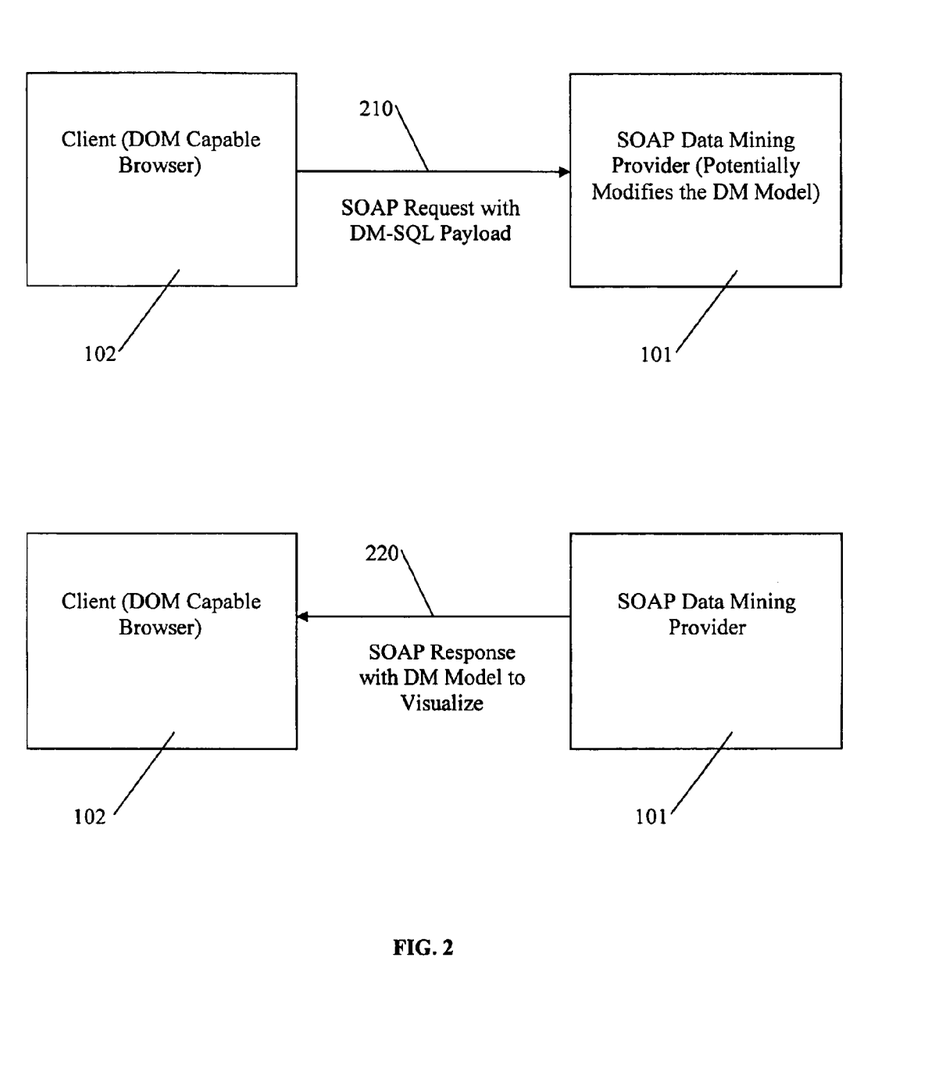
FIG. 2 is a block diagram illustrating data transmission and model updating data flows in a client/server system in accordance with an embodiment of the invention.

FIG. 2 is a block diagram illustrating data transmission and model updating data flows in a client/server system 100 in accordance with an embodiment of the invention. A client 102, typically having a browser such as Internet Explorer™, will issue a request 210 (e.g., SOAP, socket, COM, etc.), typically over the Hypertext Transfer Protocol ("HTTP"), to a server 101. The payload of the request 210 is a DM-SQL command that modifies a decision tree, or other data-mining model, that is stored in the memory 131 of the server 101. The payload of the request 210 may also specify the type of data mining model, data mining algorithm, and/or model parameters. The server 101 responds by modifying the data mining model using the information in the request 210 and applying the appropriate data to a decision tree data mining algorithm, such as CHAID (Chi-square Automatic Interaction Detection) or Entropy. The changes to the data mining model (i.e., not the entire model) are transmitted back to the client 102 in the response payload 220 for storage in the memory 130 of the client 102.

For reference, CHAID is an algorithm for fitting categorical trees in which the chi-squared statistic is used to split data into small connected data sets. Also for reference, entropy is a way to measure variability (i.e., other than statistical variance) and may be used to in decision trees to split the data into groups based on minimum entropy.

The present invention includes syntactical extensions to the SQL language. FIG. 3 is a table listing exemplary syntactical extensions 300 to the DM-SQL language in accordance with an embodiment of the invention. These extensions 300 include the following actions: erase all or part of a decision tree 310; grow a sub-tree (find split) 320; viewing an alternative split or sub-tree (goto split) 330; and, building a branch of specific values (force split) 340.

Figure 4:
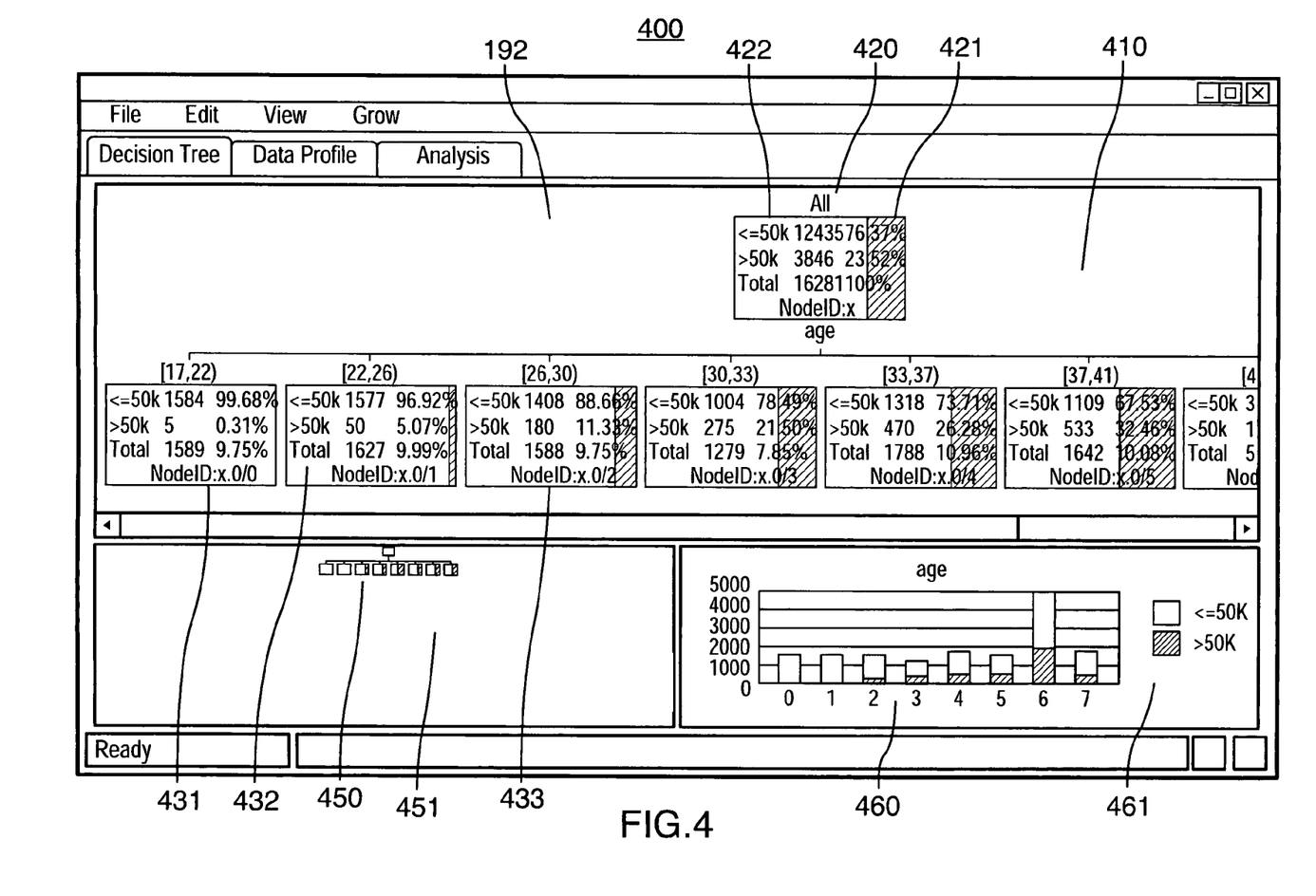
FIG. 4 is a screen capture illustrating an interactive decision tree in accordance with an embodiment of the invention.

FIG. 4 is a screen capture 400 illustrating an interactive decision tree 410 in accordance with an embodiment of the invention. The decision tree 410 may be displayed to a user in a window 192 on the display screen 140 of the client 102. FIG. 4 shows a decision tree 410 rendered using the Hypertext Markup Language ("HTML") after the sending of a request 210. The decision tree 410 has a number of nodes 420, 431, 432, 433 arranged in a hierarchy with each node being identified by a node identifier ("ID") (e.g., x for 420, x.0/0 for 431, x.0/1 for 432, x.0/2 for 433). The nodes 420, 431, 432, 433 are organized into branches or sub-trees. For example, lower level node 431 may be considered a sub-tree of upper level node 420. In general, a "node" is a decision point in a decision tree and a "leaf" is a node that is not further split (i.e., a terminal grouping).

The decision tree 410 shown in FIG. 4 pertains to the income of a group of individuals. The upper level node 420 is represented with a box icon which includes data relating to the entire group (i.e., "All"). As shown in the upper level node 420, the group consists of 16,281 individuals in total. Of this total, 12,435 or 76.37% have an income less than or equal to $50,000 (i.e., "<=50K"). And, 3,846 or 23.62% have an income greater than $50,000 (i.e., ">50K"). Note that percentages of those having an income greater than and less than or equal to $50,000 are also shown graphically by the horizontal shading of the box 420 for the upper level node 420. The 23.62% is represented by the darker shading (e.g., red) of the right side 421 of the box 420 while the 76.37% is represented by the lighter shading (e.g., green) of the left side 422 of the box 420.

The lower level nodes 431, 432, 433 represent a sub-dividing (or splitting) of the upper level node 420 according to age. For example, lower level nodes 431, 432, 433 is for the age groups 15 to 22, 22 to 26, and 26 to 30, respectively. As can be seen in the box 433 for lower level node 433, for the age group 26 to 30, of a total of 1588 individuals (or 9.75% of the total of 16,281 individuals shown in box 420), 1,408 or 88.66% have an income less than or equal to $50,000 while 180 or 11.33% have an income greater than $50,000. Note that these percentages are also shown graphically by the shading of the left and right sides of the box 433.

The screen capture 400 of FIG. 4 also shows a sub-window 451 displaying an overview 450 (or zoomed-out view) of the decision tree 410 shown in the main window 192. In addition, a second sub-window 461 is shown which displays a graph 460 corresponding to the data for the decision tree 410.

Each node 420, 431, 432, 433 has the following commands associated with it and which are listed in FIG. 3: erase split 310 to remove a portion (e.g., 431) of the tree 410; find split 320 to grow a portion of the tree 410 one level; goto split 330 to view an alternative tree or sub tree; and, force split 340 to shape the tree 410 according to user specifications.

As discussed above, these commands are implemented through syntactical extensions 300 to the DM-SQL language. A user may initiate one of these commands, for example, by selection from a menu or by manipulating elements of the decision tree 410 through the use of a cursor 190 and mouse 110. Such action causes a request 210 with the appropriate extensions 300 to be transmitted to the server 101 where the data mining model or tree 410 is modified. Changes to the data mining model or tree 410 are then transmitted back to the client 102 from the server 101 and the modified model or tree is presented to the user.

For example, and referring to FIG. 4, if the user generates an erase split command 310, the lower level node 431 can be removed from the tree 410. If the user generates a find split command 320, a new lower level node or nodes may be added to the tree 410. The new lower level node or nodes could be related to education, for example (see FIG. 5). If the user generates a goto split command 330, an alternate tree or sub-tree is presented to the user. And, if the user generates a force split command 340, the tree 410 is modified in accordance with information provided by the user.

Figure 5:
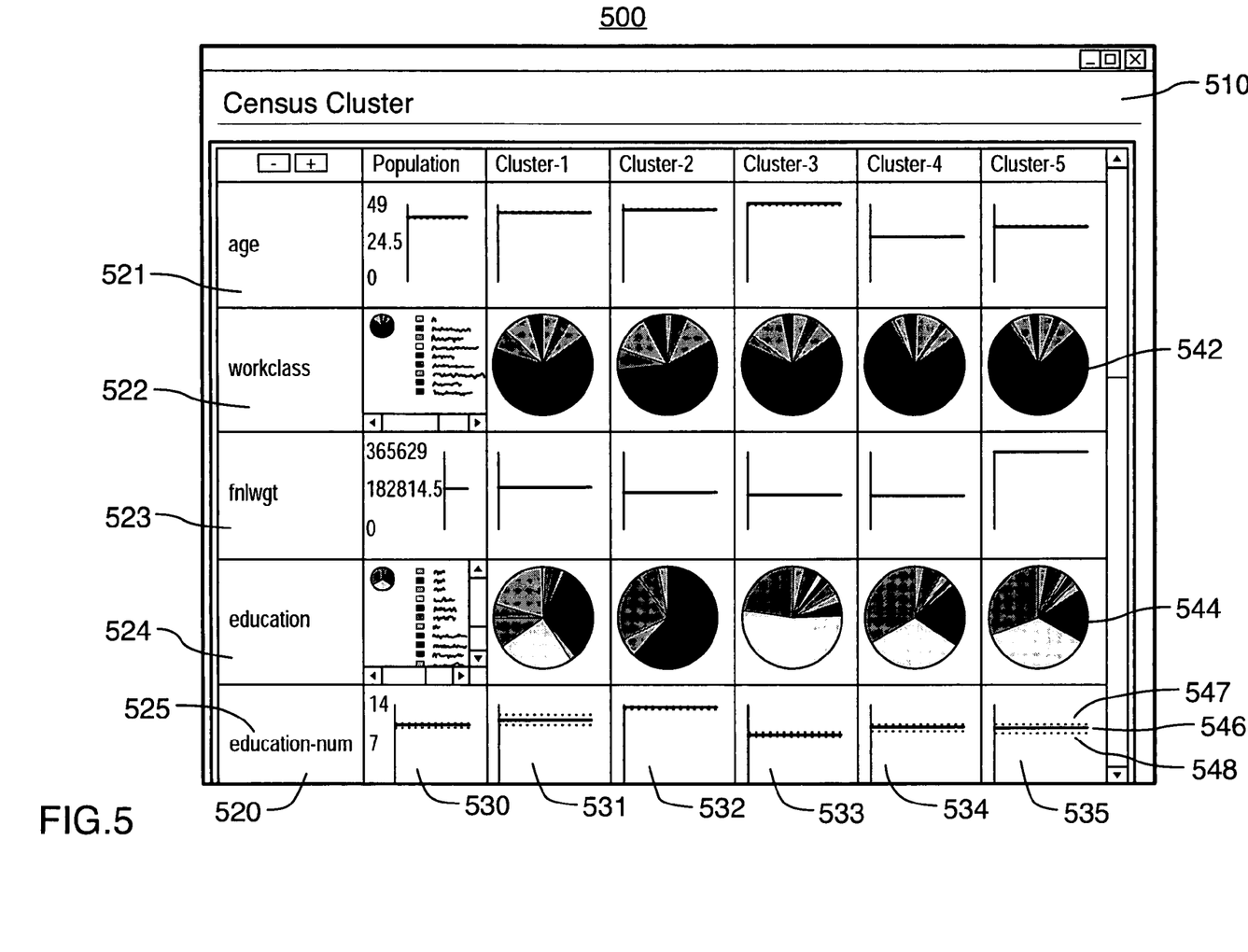
FIG. 5 is a screen capture illustrating a cluster model in accordance with an embodiment of the invention.

FIG. 5 is a screen capture 500 illustrating a cluster model 510 in accordance with an embodiment of the invention. The cluster model 510 visualized in FIG. 5 is rendered as follows: the browser 102 issues a DM-SQL command 210 to the data mining server 101; the server 101 returns the model contents via XML; and, the browser 102 renders the model using the Document Object Model ("DOM") and JavaScript™. The client 102 may be any type of client. For example, Microsoft™ NET Windows Forms or a Java™ based GUI may be used as the client 102.

In FIG. 5, the first column 520 displays variables for the model. These variables 520 may include, for example, age 521, workclass 522, fnlwgt 523 (i.e., final weight), education 524, and education-num 525 (i.e., level of education encoded as an integer). The second column 530 displays the distribution for the entire population used to train the model. Each subsequent column 531, 532, 533, 534, 535 displays the distributions for the discovered clusters, respectively. Discrete variables, for example workclass 522 and education 524, are displayed as pie charts 542, 544 for each cluster 531, 532, 533, 534, 535. Averages for continuous variables, for example age 521 and education-num 525, are displayed as a single bar 546 with dashed lines 547, 548 showing the average 546 plus 547 and minus 548 the standard deviation. A user may sort the columns by the most significant variables by clicking the respective column titles.

Figure 6:
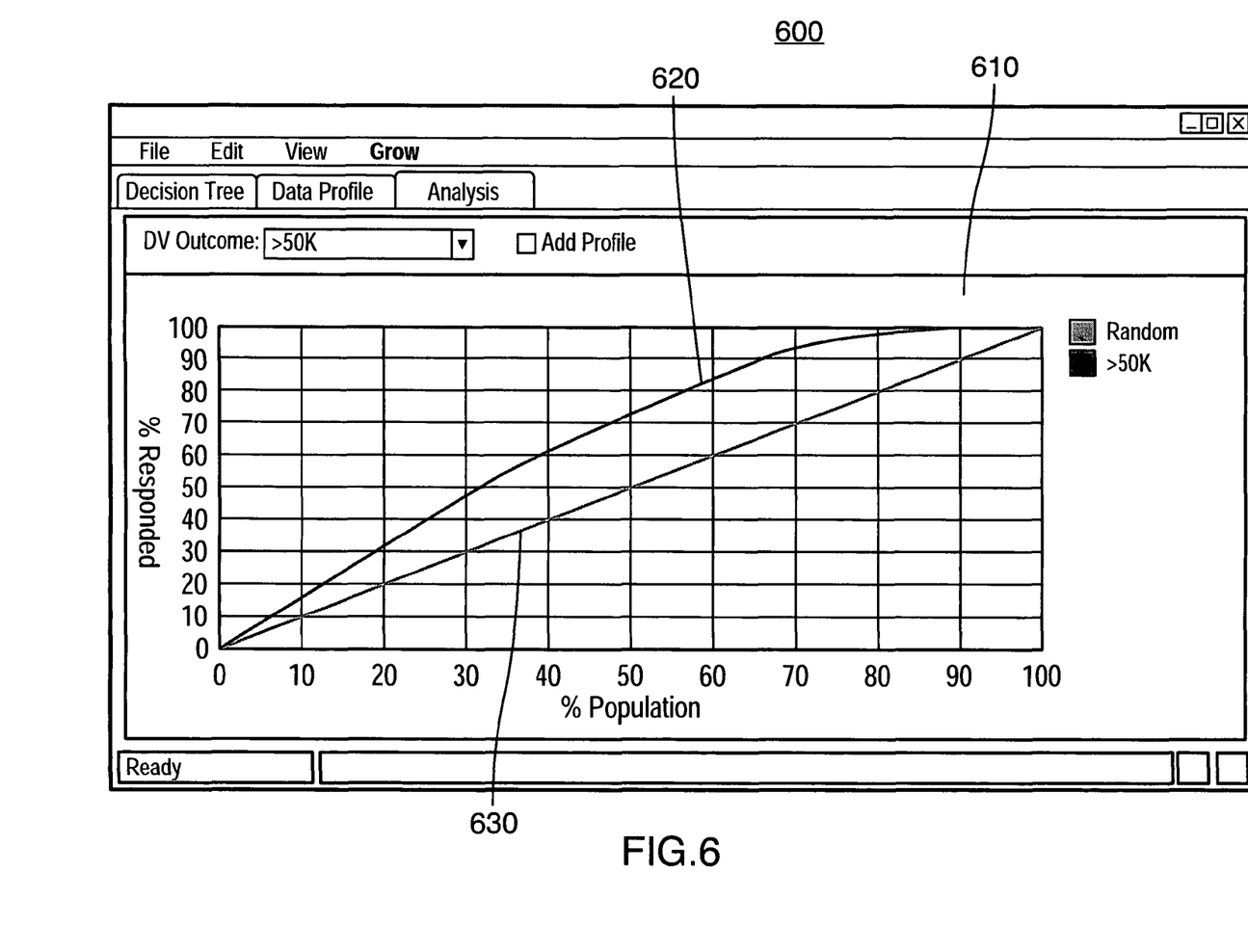
FIG. 6 is a screen capture illustrating a list chart for a predictive model in accordance with an embodiment of the invention; and, FIG. 7 is a flow chart illustrating operations of software modules within the memory of a server coupled to at least one client for modifying a data mining model for display to a user of the client, the data mining model being maintained by the server, in accordance with an embodiment of the invention.

FIG. 6 is a screen capture 600 illustrating a lift chart 610 for a predictive model in accordance with an embodiment of the invention. In general, a "lift chart" provides a visual summary of the usefulness of the information provided by one or more statistical models for predicting a binomial (i.e., categorical) outcome variable (i.e., dependent variable). For multinomial (i.e., multiple-category) outcome variables, lift charts can be computed for each category. Specifically, the chart summarizes the utility that one may expect by using the respective predictive models, as compared to using baseline information only. The lift chart is applicable to most predictive models for binomial or multinomial responses and is commonly used in data mining when the dependent or outcome variable of interest is binomial or multinomial in nature. In FIG. 6, lift values (e.g., customers responding to a mailing) are computed for each percentile of the population (e.g., customers on a mailing list). These lift values are represented by the curved line 620. A base response rate (e.g., a random selection) is represented by the inclined line 630. Note that the lift line 620 merges with the base line 630 at 100%. The lift chart 610 shows that the predictive model is most effective between, say, 50 and 70%.

In FIG. 6, the lift chart 610 is rendered in VML (i.e., vector graphics rendering) after issuing a request 210 to the data mining server 101. In particular, the rendering process is as follows: the browser 102 issues a DM-SQL command 210 to the data mining server 101; the server 101 returns the lift information via XML 220; and, the browser 102 renders the model using the DOM and JavaScript™.

Figure 7:
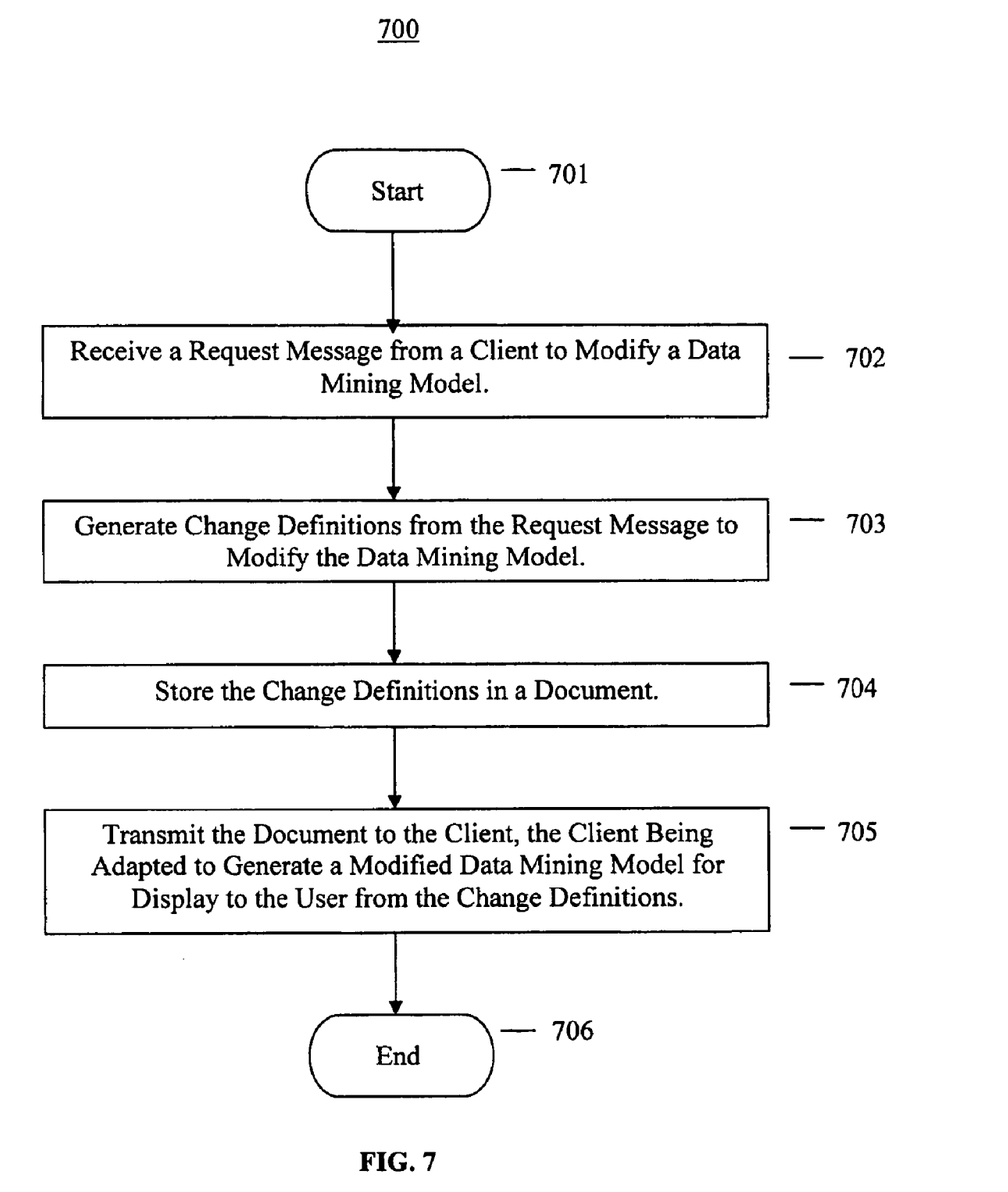

The above described method may be summarized with the aid of a flowchart. FIG. 7 is a flow chart illustrating operations 700 of software modules 171 within the memory 131 of a server 101 coupled to at least one client 102 for modifying a data mining model 410 for display to a user of the client 102, the data mining model 410 being maintained by the server 101, in accordance with an embodiment of the invention.

At step 701, the operations 700 start.

At step 702, a request message 210 is received from the client 102 to modify the data mining model 410. (Note that the request message may also include a read-only request for the model that does not necessarily modify the model.)

At step 703, change definitions are generated from the request message 210 to modify the data mining model 410. (Note that in general the model is only modified if the request message is a write operation.)

At step 704, the change definitions are stored in a document 220.

At step 705, the document 220 is transmitted to the client 102, the client 102 being adapted to generate a modified data mining model for display to the user from the change definitions.

At step 706, the operations 700 end.

Preferably, the document 220 is a mark-up language document (e.g., XML). Preferably, the request message 210 is a structured query language message (e.g., DM-SQL). Preferably, the data mining model is a decision tree 410. Preferably, the request message 210 includes at least one of: an erase split command 310 to remove a portion of the decision tree; a find split command 320 to grow a portion of the tree; a goto split command 330 to view an alternative decision tree; and, a force split command 340 to shape the decision tree 410 in accordance with user specifications. Preferably, the data mining model is a cluster model 510.

The above described method is generally performed by the server system 101. However, according to an alternate embodiment of the invention, the method can be performed by the client system 102.

While this invention is primarily discussed as a method, a person of ordinary skill in the art understands that the apparatus discussed above with reference to a client system 102 and a server system 101 may be programmed to enable the practice of the method of the invention. Moreover, an article of manufacture for use with a client system 102 and a server system 101, such as a pre-recorded storage device or other similar computer readable medium including program instructions recorded thereon may direct the client system 102 or server system 101 to facilitate the practice of the method of the invention. It is understood that such apparatus and articles of manufacture also come within the scope of the invention.

The embodiments of the invention described above are intended to be exemplary only. The scope of the invention is therefore intended to be limited solely by the scope of the appended claims.

What is claimed is:

1. A method in a server coupled to a client for modifying an original data mining model for display at the client, the original data mining model maintained by the server, the method comprising:

receiving a request message at the server from the client to modify the original data mining model for use at the client, wherein the request message is generated at the client and includes at least one command for modifying the original data mining model for use at the client;

generating change definitions at the server from the request message to modify the original data mining model for use at the client, wherein the change definitions define only changes to the original data mining model resulting from application of the at least one command to the original data mining model at the server;

storing the change definitions in a document at the server; and, transmitting the document from the server to the client, wherein the client generates a modified data mining model to replace the original data mining model at the client and for display at the client using the change definitions received from the server, whereby application of the at least one command to the original data mining model is performed at the server rather than at the client and only changes to the original data mining model resulting from the application of the at least one command to the original data mining model at the server are transmitted from the server to the client;

wherein the document is a mark-up language document; and, wherein each of the original data mining model and the modified data mining model is a decision tree.

2. The method of claim 1 wherein the request message is a syntactically extended structured query language command.

3. The method of claim 1 wherein the request message includes at least one of:

an erase split command to remove a portion of the decision tree;

a find split command to grow a portion of the decision tree;

a goto split command to view an alternative decision tree; and, a force split command to shape the decision tree in accordance with user specifications.

4. A method in a server coupled to a client for modifying an original data mining model for display at the client, the original data mining model maintained by the server, the method comprising:

receiving a request message at the server from the client to modify the original data mining model for use at the client, wherein the request message is generated at the client and includes at least one command for modifying the original data mining model for use at the client;

generating change definitions at the server from the request message to modify the original data mining model for use at the client, wherein the change definitions define only changes to the original data mining model resulting from application of the at least one command to the original data mining model at the server;

storing the change definitions in a document at the server; and, transmitting the document from the server to the client, wherein the client generates a modified data mining model to replace the original data mining model at the client and for display at the client using the change definitions received from the server, whereby application of the at least one command to the original data mining model is performed at the server rather than at the client and only changes to the original data mining model resulting from the application of the at least one command to the original data mining model at the server are transmitted from the server to the client;

wherein the document is a mark-up language document; and, wherein each of the original data mining model and the modified data mining model is a cluster model.

5. A server system coupled to a client system for modifying an original data mining model for display at the client system, the original data mining model maintained by the server system, the server system comprising:
   a processor coupled to memory and an interface to a network, and adapted to:
   receive a request message at the server system from the client system to modify the original data mining model for use at the client system, wherein the request message is generated at the client system and includes at least one command for modifying the original data mining model for use at the client system;
   generate change definitions at the server system from the request message to modify the original data mining model for use at the client system, wherein the change definitions define only changes to the original data mining model resulting from application of the at least one command to the original data mining model at the server system;
   store the change definitions in a document at the server system; and,
   transmit the document from the server system to the client system, wherein the client system generates a modified data mining model to replace the original data mining model at the client system and for display at the client system using the change definitions received from the server system, whereby application of the at least one command to the original data mining model is performed at the server system rather than at the client system and only changes to the original data mining model resulting from the application of the at least one command to the original data mining model at the server system are transmitted from the server system to the client system;
   wherein the document is a mark-up language document; and,
   wherein each of the original data mining model and the modified data mining model is a decision tree.

6. The server system of claim 5 wherein the request message is a syntactically extended structured query language command.

7. The server system of claim 5 wherein the request message includes at least one of:
   an erase split command to remove a portion of the decision tree;
   a find split command to grow a portion of the decision tree;
   a goto split command to view an alternative decision tree; and,
   a force split command to shape the decision tree in accordance with user specifications.

8. A server system coupled to a client system for modifying an original data mining model for display at the client system, the original data mining model maintained by the server system, the server system comprising:
   a processor coupled to memory and an interface to a network, and adapted to:
   receive a request message at the server system from the client system to modify the original data mining model for use at the client system, wherein the request message is generated at the client system and includes at least one command for modifying the original data mining model for use at the client system;
   generate change definitions at the server system from the request message to modify the original data mining model for use at the client system, wherein the change definitions define only changes to the original data mining model resulting from application of the at least one command to the original data mining model at the server system;
   store the change definitions in a document at the server system; and,
   transmit the document from the server system to the client system, wherein the client system generates a modified data mining model to replace the original data mining model at the client system and for display at the client system using the change definitions received from the server system, whereby application of the at least one command to the original data mining model is performed at the server system rather than at the client system and only changes to the original data mining model resulting from the application of the at least one command to the original data mining model at the server system are transmitted from the server system to the client system;
   wherein the document is a mark-up language document; and,
   wherein each of the original data mining model and the modified data mining model is a cluster model.

9. A computer program product having computer executable code for directing a server system coupled to a client system to modify a data mining model for display at the client system, the data mining model maintained by the server system, the computer program product comprising:
   code for receiving a request message at the server system from the client system to modify the original data mining model for use at the client system, wherein the request message is generated at the client system and includes at least one command for modifying the original data mining model for use at the client system;
   code for generating change definitions at the server system from the request message to modify the original data mining model for use at the client system, wherein the change definitions define only changes to the original data mining model resulting from application of the at least one command to the original data mining model at the server system;
   code for storing the change definitions in a document at the server system; and,
   code for transmitting the document from the server system to the client system, wherein the client system generates a modified data mining model to replace the original data mining model at the client system and for display at the client system using the change definitions received from the server system, whereby application of the at least one command to the original data mining model is performed at the server system rather than at the client system and only changes to the original data mining model resulting from the application of the at least one command to the original data mining model at the server system are transmitted from the server system to the client system;
   wherein the document is a mark-up language document; and,
   wherein each of the original data mining model and the modified data mining model is a decision tree.

10. The computer program product of claim 9 wherein the request message is a syntactically extended structured query language message command.

11. The computer program product of claim 9 wherein the request message includes at least one of:
    an erase split command to remove a portion of the decision tree;

a find split command to grow a portion of the decision tree;

a goto split command to view an alternative decision tree; and, a force split command to shape the decision tree in accordance with user specifications.

12. A computer program product having computer executable code for directing a server system coupled to a client system to modify a data mining model for display at the client system, the data mining model maintained by the server system, the computer program product comprising:

code for receiving a request message at the server system from the client system to modify the original data mining model for use at the client system, wherein the request message is generated at the client system and includes at least one command for modifying the original data mining model for use at the client system;

code for generating change definitions at the server system from the request message to modify the original data mining model for use at the client system, wherein the change definitions define only changes to the original data mining model resulting from application of the at least one command to the original data mining model at the server system;

code for storing the change definitions in a document at the server system; and, code for transmitting the document from the server system to the client system, wherein the client system generates a modified data mining model to replace the original data mining model at the client system and for display at the client system using the change definitions received from the server system, whereby application of the at least one command to the original data mining model is performed at the server system rather than at the client system and only changes to the original data mining model resulting from the application of the at least one command to the original data mining model at the server system are transmitted from the server system to the client system;

wherein the document is a mark-up language document; and, wherein each of the original data mining model and the modified data mining model is a cluster model.

* * * * *